(12) United States Patent
Date et al.

(10) Patent No.: US 6,229,586 B1
(45) Date of Patent: May 8, 2001

(54) REFLECTION TYPE LIQUID CRYSTAL DISPLAY DEVICE

(75) Inventors: Takashi Date; Kenji Omote, both of Fukushima-ken (JP)

(73) Assignee: Alp Electric Co., Ltd., Tokyo (JP)

( * ) Notice: Subject to any disclaimer, the term of this patent is extended or adjusted under 35 U.S.C. 154(b) by 0 days.

(21) Appl. No.: 09/250,746

(22) Filed: Feb. 16, 1999

(30) Foreign Application Priority Data

Feb. 26, 1998 (JP) .................................................. 10-045985

(51) Int. Cl.[7] .................................................. G02F 1/1333
(52) U.S. Cl. .......................................................... 349/113
(58) Field of Search .............................................. 349/113

(56) References Cited

U.S. PATENT DOCUMENTS 6,061,111 * 5/2000 Kataoka et al. ..................... 349/113

* cited by examiner

Primary Examiner—James A. Dudek
(74) Attorney, Agent, or Firm—Brinks Hofer Gilson & Lione

(57) ABSTRACT

The present invention provides a reflection type liquid display device that does not cause defects such as a short circuit between a metallic reflection film and an electrode layer that are laminated on the substrate, a break in the electrode layer, and that can be easily manufactured because the alignment of elements is easily conducted. The reflection type liquid display device according to the present invention comprises a pair of substrates, a sealing member sandwiched by the pair of substrates, and liquid crystal sealed in a space surrounded by the sealing member and the pair of substrates, and is characterized in that many depressions and projections are formed on the surface of one substrate of the pair of substrates and a metallic reflection film and a flattening film are laminated on the depressed and projected surface, and that many depressions and projections are formed on the surface of the substrate at least other than an electrode terminal forming region and the surface of the substrate is made flat in the electrode terminal forming region.

4 Claims, 5 Drawing Sheets

REFLECTION TYPE LIQUID CRYSTAL DISPLAY DEVICE

BACKGROUND OF THE INVENTION

1. Field of the Invention

The present invention relates to a reflection type liquid crystal display device, and in particular, to a reflection type liquid crystal display device that can be manufactured more easily than a conventional reflection type liquid crystal display device.

2. Description of the Related Art

In general, a liquid crystal display device is available in a transparent type device provided with backlighting and a reflection type device. A reflection type liquid crystal display device uses only external light such as sun light, illumination light and displays without backlighting, and is used mainly in a personal digital assistant required to be thin and lightweight.

FIG. 4 is a partial cross sectional view of one example of a conventional liquid crystal display device of reflection plate built-in type. The liquid crystal display device 1 of reflection plate built-in type generally comprises a pair of vertically-opposed glass substrates 2 and 3, a sealing member 4 sandwiched by the pair of glass substrates 2 and 3, and liquid crystal 5 sealed in a space surrounded by the sealing member 4 and the pair of glass substrates 2 and 3. On the obverse surface of the upper glass substrate 2, phase difference plates 6, 7 and a polarizing plate 8 are laminated from the bottom side. On the reverse surface of the upper glass substrate 2, a color filter 9, a flattening film 17, an electrode layer 10 made of ITO (indium tin oxide), an orientation film 31 are laminated. Further, on the obverse surface of the lower glass substrate 3, an organic film 12 having depressions and projections on the surface thereof, a metallic reflection film 13, a flattening film 14, an electrode layer 15 made of ITO, and an orientation film 16 are laminated in order.

FIG. 5 is a partial enlarged cross sectional view of the portion near the end of the metallic reflection film 13 of the liquid crystal display device 1 of reflection plate built-in type. In the drawing, it should be appreciated that the various elements have not been drawn to exact scale and that some dimensions have been emphasized so that the invention disclosed can be clearly understood. The thickness of the lower glass substrate is about 0.7 mm, the maximum thickness of the organic film 12 is about 4 µm, the thickness of the metallic reflection film 13 is about 1000 Å, the maximum thickness of the flattening film 14 is about 5 µm, and the thickness of the electrode layer 15 is about 2000 Å. Further, the height of the depression and projection on the surface of the organic film 12 is about 1 to 2 µm.

When the depressions and projections are formed on the surface of the organic film 12 laminated on the lower glass substrate 3 by pressing a die to manufacture the reflection body, the shape of depression and projection tends to be disturbed at the end of the depressed and projected surface and an extremely pointed protrusion 12a, as shown in FIG. 5, might be formed. If the pointed protrusion 12a is formed, it is difficult to flatten the depressed and projected surface by the insulating flattening film 14 and hence the electrode layer 15 might be broken, or the metallic reflection film 13 and the electrode layer 15 might make a short circuit at the pointed protrusion 12a. In particular, in the electrode terminal forming region where the wiring lines of the electrode layer 15 are made dense because they are connected to a LSI or the like and where a wiring pattern is made complex because a circuit is formed, there is a strong possibility that the defective electrode layer 15 causes a serious problem in the liquid crystal display device 1 of reflection plate built-in type.

On the other hand, an alignment mark is formed on the glass substrate as a part used for aligning the glass substrates which are overlaid on each other or for printing the sealing member or the color filter on the substrate. FIG. 6 is a cross sectional view of one example of the alignment mark formed on the glass substrate. As shown in FIG. 6, the alignment mark 15a on the lower glass substrate 3 is formed by patterning ITO, which is the same layer as the electrode layer 15, on the peripheral portion of the lower glass substrate 3. In this respect, if the depressions and projections are formed on the entire surface of the lower glass substrate 3, it is difficult to recognize the alignment mark 15a and hence to manufacture the liquid crystal display device.

SUMMARY OF THE INVENTION

The present invention has been achieved in consideration of the above-described drawbacks of the conventional reflection type liquid crystal display device. An object of the present invention is to provide a reflection type liquid crystal display device that does not cause defects of a short circuit between a metallic reflection film and an electrode layer which are laminated on a substrate or a break in the electrode layer and that can be easily manufactured because various elements can be easily aligned.

A reflection type liquid crystal display device according to the present invention comprises a pair of substrates, a sealing member sandwiched by the pair of substrates, and liquid crystal sealed in a space surrounded by the sealing member and the pair of substrates, and is characterized in that many depressions and projections are formed on the surface of one substrate of the pair of substrates and that a metallic reflection film and a flattening film are laminated on the depressed and projected surface, and that many depressions and projections are formed on the surface of the substrate at least other than an electrode terminal forming region and that the surface of the substrate is made flat in the electrode terminal forming region.

In this specification, an electrode terminal forming region means a region where a terminal is formed to connect the wiring lines of an electrode layer to a LSI or the like or to form a drive circuit.

That is, in the electrode terminal forming region where the wiring lines of the electrode layer are made dense because they are connected to the LSI or the like or where a wiring pattern is made complex because the circuit is formed, the flat surface of the substrate can be made flat because many depressions and projections on the surface of the substrate are not formed there. This prevents defects such as a break in the electrode layer in the electrode terminal forming region and hence can improve the yield of the reflection type liquid crystal display device.

A reflection type liquid crystal display device according to the present invention is characterized in that many depressions and projections are formed on the surface of the substrate other than the electrode terminal forming region and an alignment mark forming region, and that the surface of the substrate is made flat in the electrode terminal forming region and the alignment mark forming region.

That is, when the glass substrates are overlaid on each other or the sealing member or the color film is printed, the alignment mark can be easily recognized because many depressions and projections are not formed on the surface of the substrate in the alignment mark forming region where the alignment mark is formed as a part for aligning the substrates, the sealing member, or the color film.

Further, the reflection type liquid crystal display device according to the present is characterized in that a boundary between a region where many depressions and projections are formed on the surface of the substrate and a flat region lies outside the sealing member, and that the end of the metallic reflection film lies inside the boundary and outside the sealing member.

That is, there is a possibility that a protrusion might be formed at the boundary of the region where many depressions and projections are formed on the surface of the substrate and a flat region, but since the boundary lies outside the sealing member, a gap between the substrates is not changed by the protrusion in the liquid crystal layer sealed inside the sealing member, which can provide a reflection type liquid crystal display device of good display quality. Further, since the end of the metallic reflection film lies inside the boundary and outside the sealing member, even if the protrusion is formed at the boundary, the metallic reflection film is not formed on the protrusion and hence the metallic reflection layer and the electrode layer do not make a short circuit, which can improve the yield of the reflection type liquid crystal display device.

The substrate may be made of transparent substrate on which a resin layer having depressions and projections on the surface thereof is laminated and may be made of transparent substrate having depressions and projections on the surface thereof.

DESCRIPTION OF THE PREFERRED EMBODIMENTS OF THE INVENTION

The present invention will be described in details with reference to accompanying drawings, but it will be understood that it is not intended to limit the present invention to these preferred embodiments.

Figure 1:
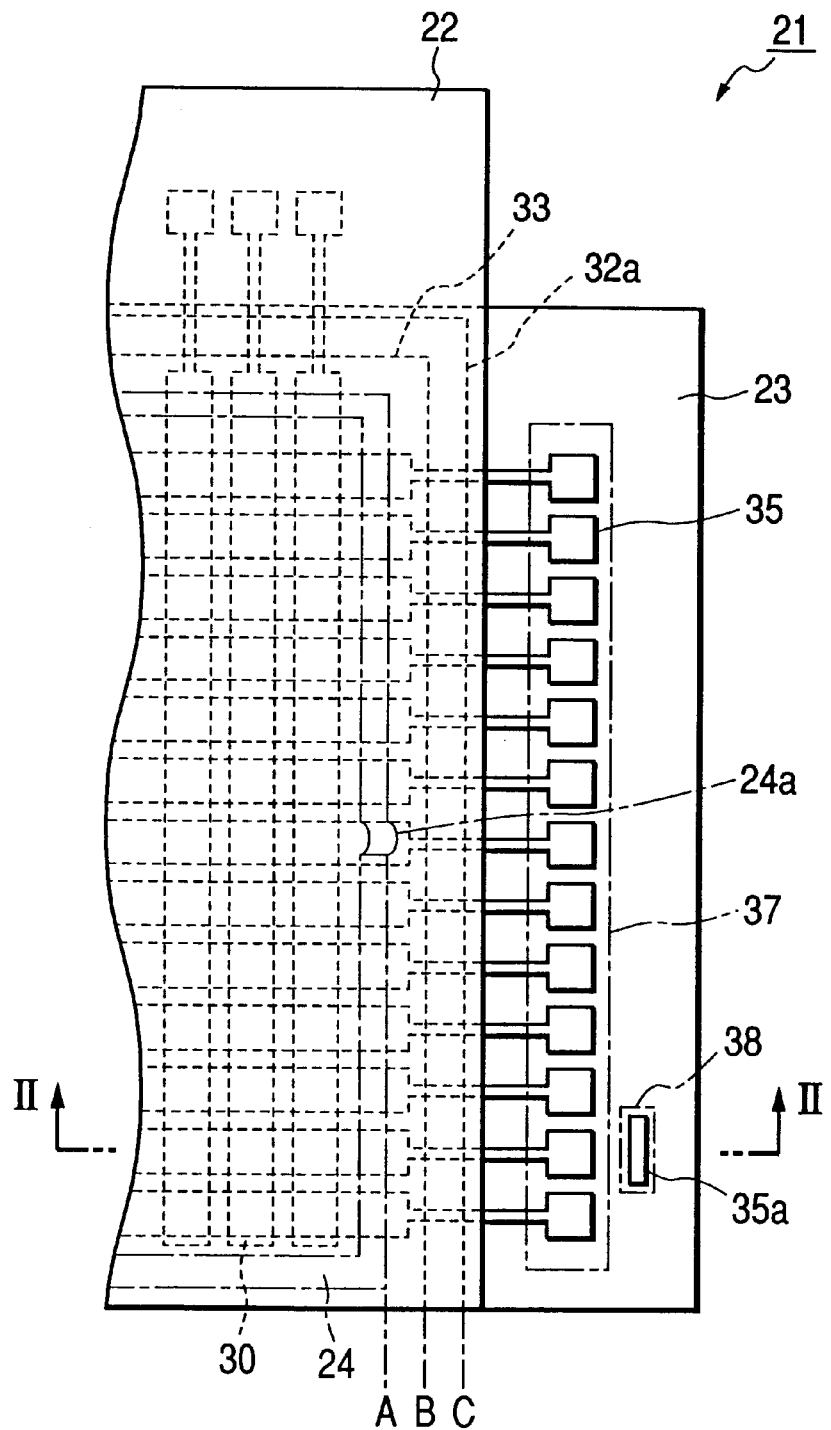
FIG. 1 is a plan view of one preferred embodiment of a reflection type liquid crystal display device according to the present invention.
Figure 2:
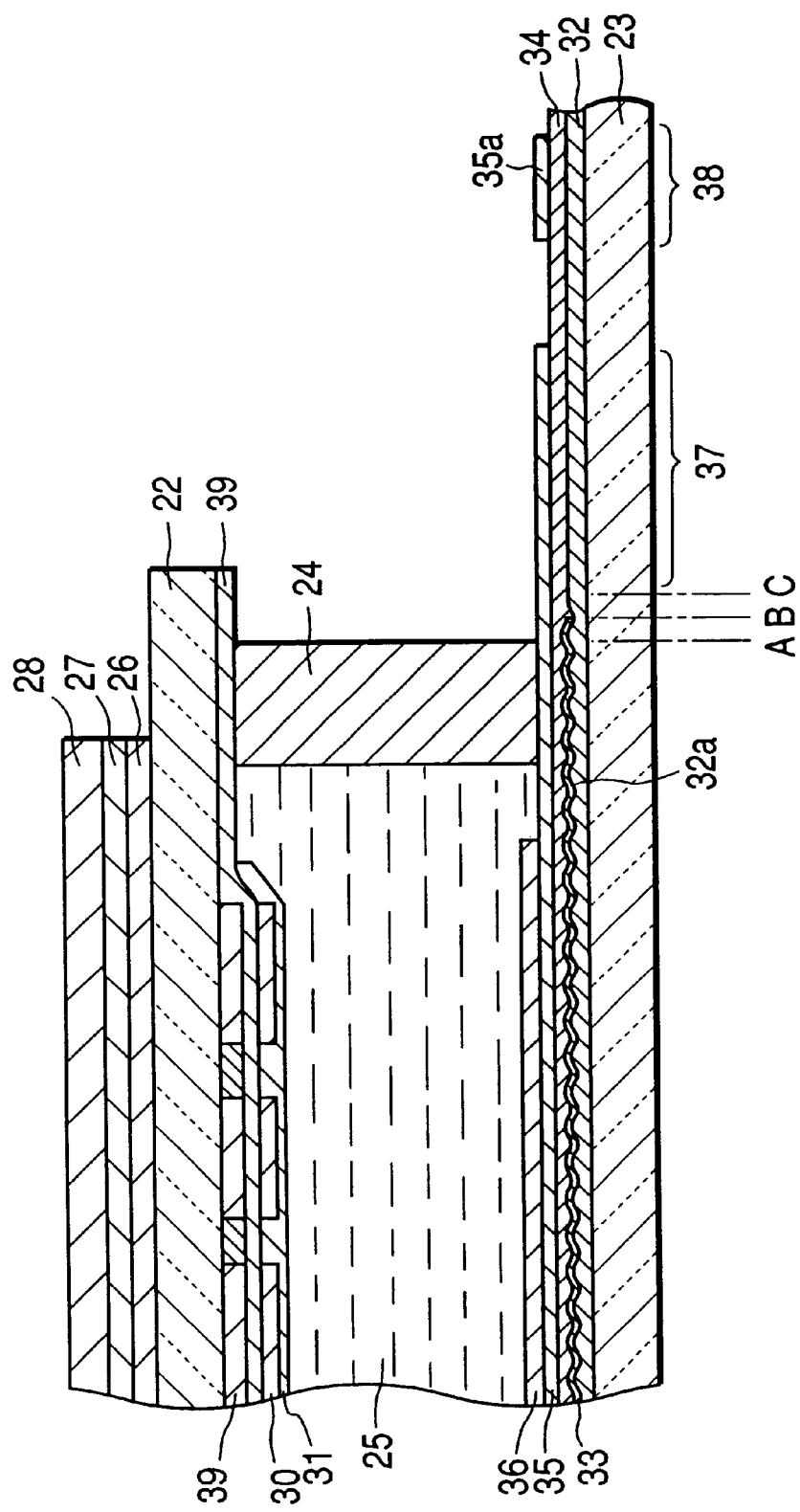
FIG. 2 is a cross sectional view of a reflection type liquid crystal display device 21 of one preferred embodiment.

FIG. 1 is a plan view of one preferred embodiment of a reflection type liquid crystal display device according to the present invention. FIG. 2 is a cross sectional view of a reflection type liquid crystal display device of the preferred embodiment. This reflection type liquid crystal display device is one example of a simple matrix type. As shown in FIG. 2, this reflection type liquid crystal display device 21 comprises a pair of vertically-opposed glass substrates 22 and 23, a sealing member 24 sandwiched by the vertically-opposed glass substrates 22 and 23, and liquid crystal 25 sealed in a space surrounded by the sealing member 24 and the pair of glass substrates 22 and 23. On the obverse surface of the upper glass substrate 22, phase difference plates 26, 27 and a polarizing plate 28 are laminated from the bottom side. On the reverse surface of the upper glass substrate 22, a color filter 29, a flattening film 39, an electrode layer 30, an orientation film 31 are laminated. Further, on the obverse surface of the lower glass substrate 23, an organic film 32, a metallic reflection film 33, a flattening film 34, an electrode layer 35, and an orientation film 36 are laminated in order.

In this respect, the orientation films 31 and 36 are made by rubbing a polymeric film such as polyimide. As described below, photosensitive resin comprising acrylic base resist, polystyrene base resist or the like is used as the organic film 32. The metallic reflection film 33 is made of metal such as aluminum and silver. The flattening film 34 is made of acrylic base resin.

As shown in FIG. 1 and FIG. 2, the sealing member 24 is formed such that it surrounds the liquid crystal and has a liquid crystal sealing port 24a for pouring the liquid crystal at a part of the sealing member 24. As shown in FIG. 2, the end B of the metallic reflection film 33 lies outside the end A of the sealing member 24, and the end C of the depressed and projected portion 32a of the organic film 32 lies outside the end B of the metallic reflection film 33. The organic film 32 is made flat in the part other than the depressed and projected portion 32a.

Even if a protrusion is formed at the end C of the depressed and projected portion 32a of the organic film 32, because the metallic reflection film 33 is not formed at the protrusion in the above-mentioned constitution, the metallic reflection film 33 and the electrode layer 35 do not make a short circuit.

In FIG. 2, an electrode terminal forming region 37 means a region where a terminal is formed to connect the wiring lines of the electrode layer to a LSI or to form a drive circuit. Further, an alignment mark forming region 38 means a region where an alignment mark is formed to overlap the glass substrates and to align the sealing member and the color filter when they are printed.

As shown in FIG. 2, the organic film 32 is made flat in the electrode terminal forming region 37 and the alignment mark forming region 38, and the metallic reflection film 33 is not formed there. This prevents a short circuit made by the electrode layer 35 of the electrode terminal forming region 37 and the metallic reflection film 33, and makes it easy to recognize the alignment mark 35a.

Next, a method will be described for manufacturing the organic film 32 having the depressed and projected portion in the center.

In order to manufacture the organic film 32 in the present preferred embodiment, a plate having many depressions on the surface thereof is formed in advance to make a mother die, and a transfer die is formed by the use of the mother die, and then the organic film 32 is manufactured from the transfer die.

FIG. 3 shows a flow of one example of a method for manufacturing the organic film 32.

Figure 3A:
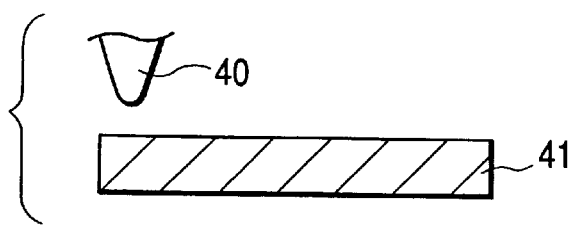
FIGS. 3a–3f are a flow of one example of a method for manufacturing an organic film 32.
Figure 3B:
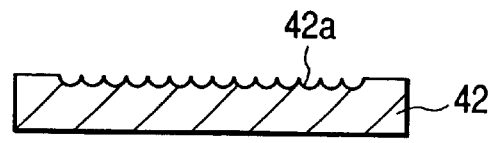

As shown in FIG. 3A, for example, many depressions 42a which are different in depth and pitch from each other are formed by hammering a pressing unit 40 many times on the surface of a plate-shaped base material 41 for the mother die made of brass, stainless steel, tool steel or the like at the portion where a reflection plate is to be formed to produce the mother die 42 for forming a reflection body shown in FIG. 3B.

Figure 3C:
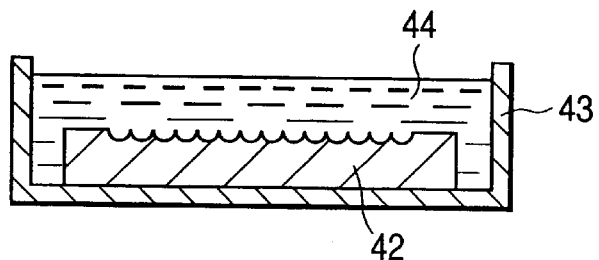
Figure 3D:
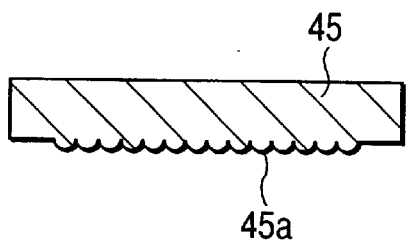

Next, as shown in FIG. 3C, the mother die 42 is placed in a box-shaped container 43, and resin material 44 like silicon, for example, is poured into the container 43 and is cured at ordinary temperatures, and the cured resin material is taken out of the container 43 and the unnecessary portions are cut off. A transfer die 45 having a die surface 45a having many projections opposite to many depressions on the die surface of the mother die 42 shown in FIG. 3D is formed in this way.

Figure 3E:
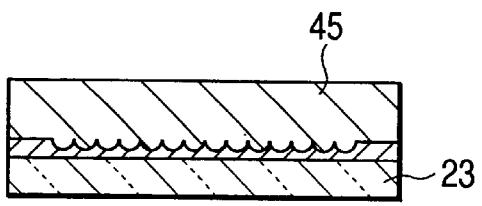
Figure 3F:
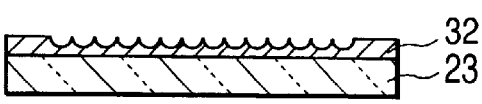
Figure 4:
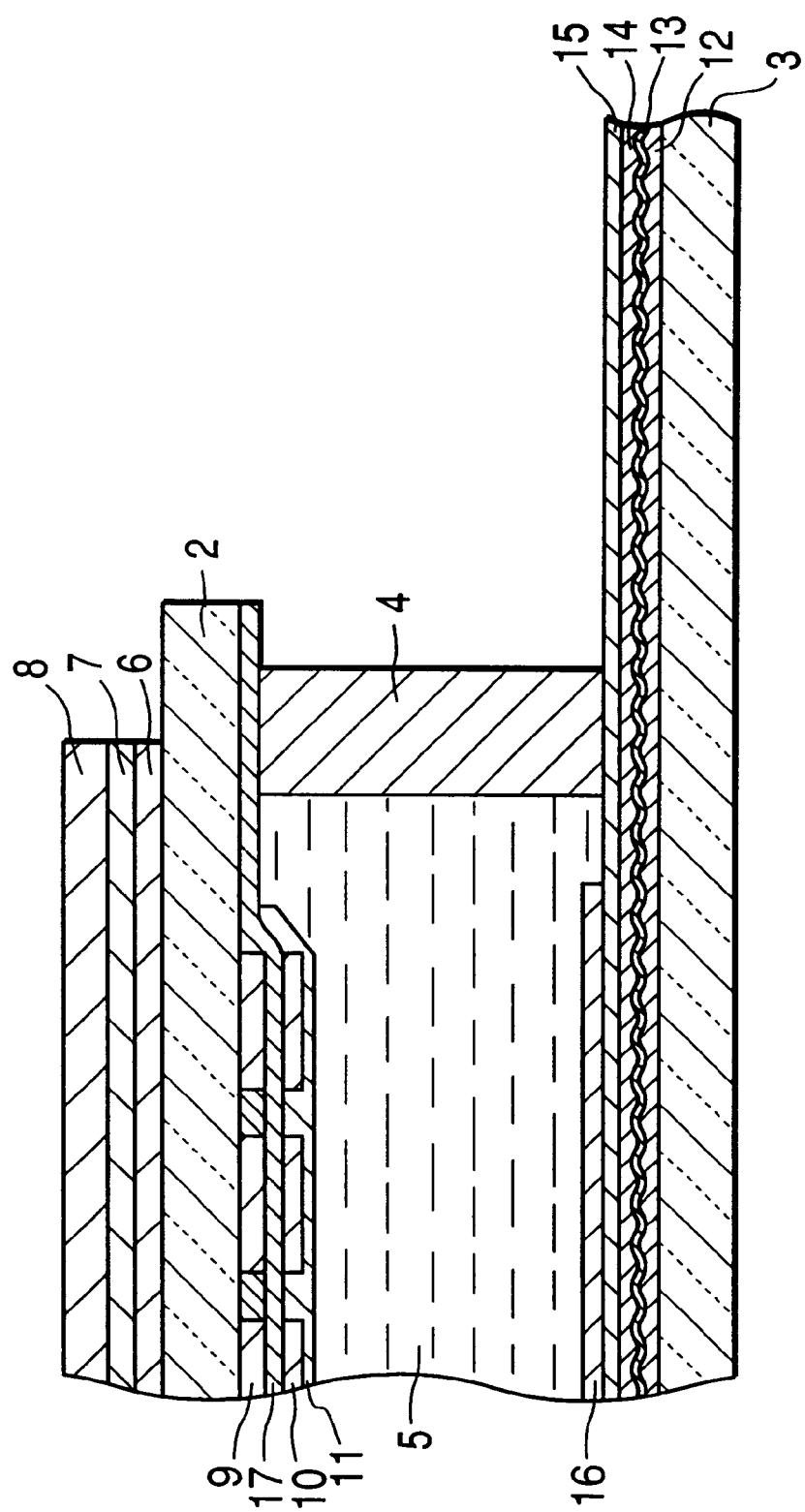
FIG. 4 is a partial cross sectional view of one example of a conventional reflection type liquid crystal display device.
Figure 5:
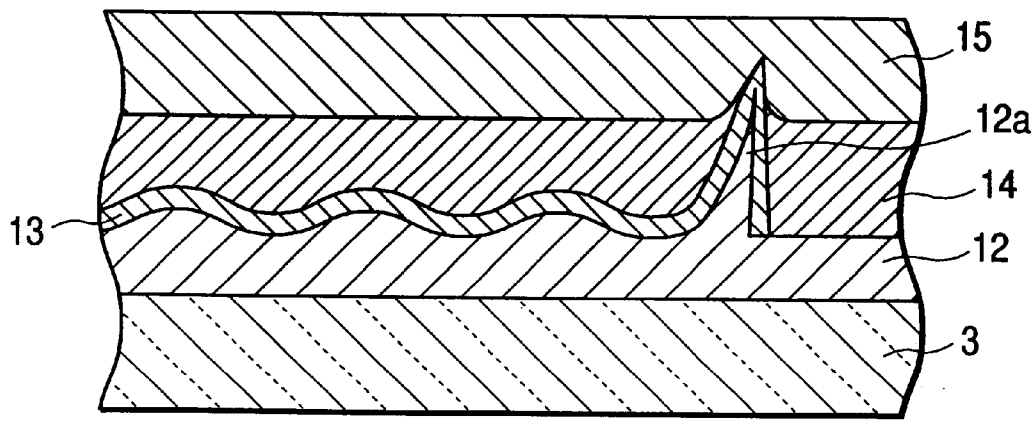
FIG. 5 is a partially enlarged cross sectional view of a reflection type liquid crystal display device 1.
Figure 6:
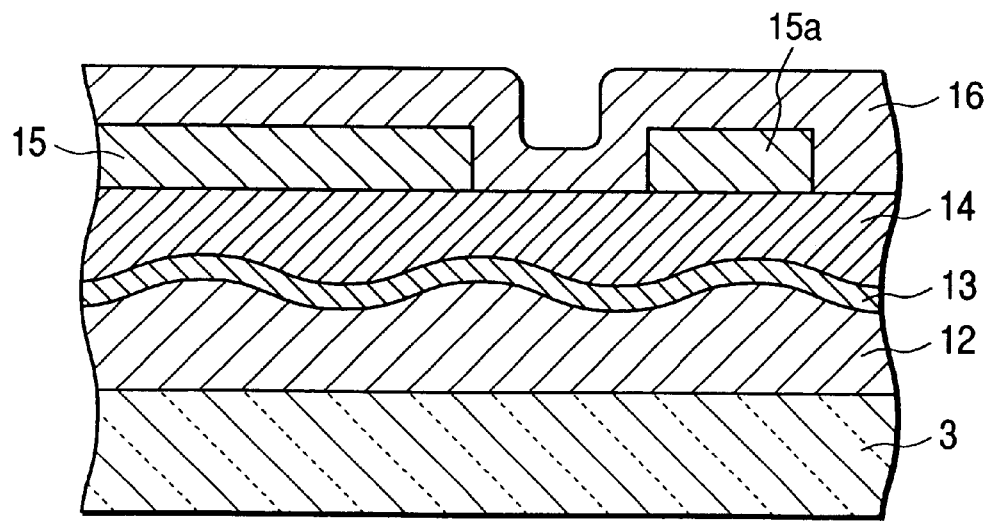
FIG. 6 is a cross sectional view of one example of an alignment mark formed on a glass substrate.

Next, as shown in FIG. 3E, the transfer die 45 is pressed on the lower glass substrate 23 having the organic film 32 of photosensitive resin layer comprising acrylic base resist, polystyrene base resist or the like to transfer the die surface of the transfer die 45 to the organic film 32 and then the organic film 32 is cured. The organic film 32 having depressions and projections in the center as shown in FIG. 3F is made in this way.

After the peripheral flat portion of the organic film 32 made in this way and the end of the depressed and projected surface neighboring the peripheral flat portion are covered by a masking material, a metallic reflection film 33 is evaporated onto the organic film 32 and then the masking material is removed. The metallic reflection film 33 can be formed in this way only in the center of the depressed and projected surface of the organic film 32.

As described above, in the reflection type liquid crystal display device of the present preferred embodiment, the end of the metallic reflection film 33 lies outside the end of the sealing member 24 and the end of the depressed and projected portion 32a of the organic film 32 lies outside the end of the metallic reflection film 33. Therefore, even if a protrusion is formed in the end of the depressed and projected portion 32a of the organic film 32, the metallic reflection film 33 is not formed on the protrusion and hence the metallic reflection film 33 and the electrode layer 35 do not make a short circuit.

Further, the organic film 32 is made flat and the metallic reflection film 33 is not formed in the electrode terminal forming region 37 and the alignment mark forming region 38. Accordingly, the electrode layer 35 in the electrode terminal forming region 37 and the metallic reflection film 33 do not make a short circuit and the alignment mark 35 can be easily recognized.

In this regard, it is not intended to limit the invention to the preferred embodiment described above, but it is intended to cover all alternatives, modifications and equivalents that may be included within the spirit and scope of the invention as defined by the appended claims. For example, the materials of the glass substrates 22 and 23, the organic film 32, the metallic reflection film 33 and the like may be changed when necessary.

Although the reflection type liquid display device of the present preferred embodiment is the simple matrix type, the present invention can be applied to a reflection type liquid display device of active matrix type.

As described above, in the reflection type liquid display device according to the present invention, many depressions and projections are formed on the surface of the substrate at least other than the electrode terminal forming region and hence the electrode terminal forming region has the flat surface of the substrate because many depressions and projections are not formed on the surface of the substrate in the region. Therefore, the electrode layer in the electrode terminal forming region does not cause a defect like a broken wire and hence can improve the yield of the reflection type liquid display device.

Since many depressions and projections are not formed on the surface of the substrate also in the alignment mark forming region, the alignment mark can be easily recognized.

Further, there is a possibility that the protrusion might be made at the boundary between the region where many depressions and projections are formed on the surface of the substrate and the flat region. However, the boundary between the region where many depressions and projections are formed and the flat region lies outside the sealing member in the reflection type liquid display device according to the present invention. Therefore, the gap between the substrates is not changed by the protrusion in the liquid crystal layer sealed inside the sealing member, whereby the reflection type liquid display device of good display quality can be produced. Since the end of the metallic reflection film lies inside the boundary and outside the sealing member, even if the protrusion is made at the boundary, the metallic reflection film is not formed on the protrusion and hence the metallic reflection film and the electrode layer do not make a short circuit, which can improve the yield of the reflection type liquid display device.

What is claimed is:

1. A reflection type liquid crystal display device comprising:

a pair of substrates, one of the pair of substrates having an electrode terminal forming region and an alignment mark forming region;

a sealing member sandwiched by the pair of substrates; and liquid crystal sealed in a space surrounded by the sealing member and the pair of substrates, wherein a plurality depressions and projections are formed on a surface of the one of the pair of substrates in a region other than the electrode terminal forming region and the alignment mark forming region and a metallic reflection film and a flattening film are laminated on the surface having the depressions and projections, and a surface of the one substrate in the electrode terminal forming region and the alignment mark forming region is flat.

2. A reflection type liquid crystal display device according to claim 1, wherein a boundary between the region where a plurality of depressions and projections are formed on the surface of the one substrate and a flat region lies outside the sealing member, and wherein an end of the metallic reflection film lies inside the boundary and outside the sealing member.

3. A reflection type liquid crystal display device according to claim 1, wherein one of the pair of substrates comprises a transparent substrate on which a resin layer having depressions and projections on the surface thereof is laminated.

4. A reflection type liquid crystal display device according to claim 1, wherein one of the pair of substrates comprises a transparent substrate having depressions and projections on the surface thereof.

* * * * *